(12) United States Patent
Follero

(10) Patent No.: US 9,081,631 B2
(45) Date of Patent: Jul. 14, 2015

(54) METHOD FOR EXECUTING A TOOLKIT ACTION IN AN IC CARD

(75) Inventor: Giulio Follero, Pozzuoli (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 12 days.

(21) Appl. No.: 13/472,660

(22) Filed: May 16, 2012

(65) Prior Publication Data

US 2013/0007204 A1    Jan. 3, 2013

(30) Foreign Application Priority Data

Jun. 30, 2011  (IT) .............................. MI11A001220

(51) Int. Cl.
| | | |
|---|---|---|
| *G06F 15/16* | (2006.01) | |
| *G06F 9/54* | (2006.01) | |
| *H04W 4/00* | (2009.01) | |

(52) U.S. Cl.
CPC ............... *G06F 9/541* (2013.01); *H04W 4/003* (2013.01)

(58) Field of Classification Search
CPC ............................... G06F 15/16; G06F 15/177
USPC ................... 709/217; 455/558, 423
See application file for complete search history.

(56) References Cited

U.S. PATENT DOCUMENTS

| | | | | |
|---|---|---|---|---|
| 2006/0205435 | A1* | 9/2006 | Lee et al. ...................... | 455/558 |
| 2008/0270890 | A1 | 10/2008 | Stern | |
| 2009/0082008 | A1* | 3/2009 | Thorell ......................... | 455/423 |
| 2009/0172519 | A1* | 7/2009 | Xu et al. ....................... | 715/234 |
| 2011/0111802 | A1* | 5/2011 | Richter et al. ............... | 455/558 |

FOREIGN PATENT DOCUMENTS

| | | |
|---|---|---|
| FR | 2805912 | 9/2007 |
| WO | WO2007/105084 | 9/2007 |

* cited by examiner

*Primary Examiner* — Vivek Srivastava
*Assistant Examiner* — Normin Abedin
(74) *Attorney, Agent, or Firm* — Allen, Dyer, Doppelt, Milbrath & Gilchrist, P.A.

(57) ABSTRACT

An approach for executing a toolkit action in an IC card includes storing in the IC card one or more identifiers and corresponding toolkit actions, and passing a web page in input to a converter in the IC card. The converter is configured to identify one or more of the identifiers in the html page and related text information associated with the identifiers. The approach includes sending the toolkit actions corresponding to the identifiers identified and the related text information to an application SIM Application Toolkit (SAT) of the IC card, for displaying the text information of the web page as SIM Application Toolkit menu.

17 Claims, 3 Drawing Sheets

METHOD FOR EXECUTING A TOOLKIT ACTION IN AN IC CARD

FIELD OF THE INVENTION

The present invention relates in general to the field of integrated circuit (IC) cards, and more specifically to the execution a SIM Application Toolkit (SAT) action in an IC card that includes a SAT for execution of actions on a handset controlled by the IC Card.

BACKGROUND OF THE INVENTION

As is known, an IC Card may include a group of commands, called a SIM Application Toolkit (SAT), that is able to execute actions that interest a respective handset or the telecommunication network. These actions are generally indicated as proactive commands. For example, a known proactive command of the IC Card requests the handset to display a text menu. The user can scroll the text menu, select its entries or display a sub-menu for using the services and the applications of the card, as schematically shown in FIG. 1a.

It is also known that the SAT does not support multi-media contents, for example videos, images, sound recordings, hyper-text connections, etc. and thus cannot execute actions such as the displaying of a video, of an image or of a hyper-text content associated with a respective connection or the listening of a sound recording.

In particular, for the execution of multi-media contents, some IC Cards are provided with a Smart Card Web Server (SCWS) that receives at the input an http request and sends at the output, on the handset, the related videos, images, sound recordings, hyper-text connections for the user. In other words, the SCWS allows to display an application and to supply a service of the IC Card under the form of an interactive web page for the user, as shown in FIG. 1a, while the SAT is limited to the display of text contents with a simpler menu interaction for the user.

However, some IC Cards are not provided with SCWS but only with the SAT. As a consequence, a same application must be coded in two different versions, i.e. a version comprising text contents for the SAT and a version comprising multi-media contents for the SCWS, the two versions being developed in different languages and with different techniques. For example, if a telecommunication operator commissions a new application from a developer, the developer must foresee two versions.

In other words, the effort made for developing a service is substantially doubled, to foresee the two different versions of the application; moreover, it is difficult to maintain the uniformity of the versions, when the application is updated, for example, on demand by the telecommunication operator. Finally, the occupation in the memory of the application is rather high since, during the manufacturing step, both versions of the application are stored on all the IC Cards.

The technical problem underlying the present approach is that of avoiding the writing of two different versions of the applications, one for the SCWS and one for the SAT, storing only one version of the application inside the IC Card which can be interpreted by the SAT or by the SCSW, when available both on the IC Card and on the handset, overcoming the limits and the drawbacks still affecting the methods and the IC Cards of the prior art.

SUMMARY OF THE INVENTION

The approach underlying the present embodiments is that of executing a converter in the IC Card that receives at the input a web page coded in a markup language (e.g. html or xml), identifies its text content of interest for the user and converts it into a proactive command of the SIM Application Toolkit (SAT), allowing the text content of the html page to display on the handset, although the handset is not provided with smart card web server SCWS.

According to this approach, the technical problem is addressed by a method for executing a SAT action in an IC card, including storing in the IC card one or more identifiers and corresponding SAT actions, giving, at the input to a converter of the IC card, an html page, this converter being arranged for identifying one or more identifiers in the html page and related text information associated with the identifiers. The method includes sending the SAT actions corresponding to the identifiers identified and the related text information to a handset for displaying the text information of the html page through SAT actions.

Advantageously, according to the method of the present approach, the html page can be coded only once and be interpreted by the IC Card, and displayed in different modes by the handsets according to whether they are provided or not with the smart card web server SCWS. In particular, the handset provided with the SAT displays the text information under the form of the SAT or text menu and the handset provided with the SCWS displays the text information in an html page, provided with the respective hypertext content, i.e. images, videos, sound recordings, hypertext connections. Naturally, nothing forbids that also the handset provided with the SCWS is programmed for displaying one or more html pages as text and the SAT menu, through the SAT. Advantageously, since the converter allows displaying the text content of an html page also in the handset not provided with SCWS, it is possible to program the applications and the services for the user only once, i.e. avoiding coding different versions of the application.

According to an aspect, the web page can be an interactive page, comprising one or more identifiers of SAT actions that can be identified by the converter. The text information related to the identifiers of the SAT actions, that request an input from the handset, are acquired by a user's input. Advantageously, according to this aspect, the converter is able to manage web pages with interactive contents and to interact, through the SAT, with the user.

The html page is stored in the IC Card and can be recalled by a browser compatible with the SCWS of a handset wherein the card is inserted. In particular, according to this aspect, it is provided that the html page can be recalled through an IP address that can be inserted in the addresses, preferably associated with a predefined port. When the IP address is inserted, the handset inquires the IC Card and the converter of the IC Card does not execute the analysis of the html page associated but gives back to the browser, through the handset, the html page just as stored on IC Card.

According to one embodiment, the converter identifies the text information through a marker or tag associated with the respective identifier. In particular, the identifiers, the corresponding SAT actions and the markers are stored in a memory of the IC Card, preferably in a table of this memory. Advantageously, the IC Card has on board all the resources needed for analyzing the html page, executing its scanning or the parsing and withdrawing of the text information to display as text and the SAT menu.

According to another aspect, it is provided that the converter executes a servlet associated with a dynamic html page, transmitting to the servlet, i.e. an application executed on the IC Card that can generate dynamically pages and interact with the SAT, the text information acquired by the user's input. Preferably, the servlet is stored in the IC Card and is thus executed off-line.

According to a another embodiment, the identifiers comprise a common root (SCSW) and an identifying suffix of the corresponding SAT action. Advantageously, this coding is easily readable for the programmer, allowing a quick identification or modification of the portion of code of the html page intended for being analysed by the converter of the card.

In particular, it is provided that the converter groups, in a single SAT action, two or more pieces of information associated with two or more corresponding identifiers. This grouping comprises the identification of a suffix, preferably a numeral, common to the identifiers. Advantageously, this coding by suffixes allows an easy identification, in the converter of the card, of several parameters or components for composing a single proactive command. Also the identification of the identifiers of an interactive html page is simplified through a predetermined suffix (FORM) of the identifiers (SCSW_INPUT).

The above technical problem is also addressed by an IC card comprising a SIM Application Toolkit (SAT) and including a memory storing one or more identifiers and corresponding toolkit actions, and a converter arranged for receiving at the input an html page and for identifying one or more of the identifiers in the html page and text information associated with the respective identifiers. The SAT receives the toolkit actions corresponding to the identifiers identified and the related text information, for displaying the text information of the html page as proactive commands SAT.

BRIEF DESCRIPTION OF THE DRAWINGS

Further characteristics and advantages of the method and of the IC Card according to the present embodiments will be apparent from the following description and from the figures here provided only by way of example and without limiting the scope of protection of the present invention.

DETAILED DESCRIPTION OF THE PREFERRED EMBODIMENTS

Figure 1A:
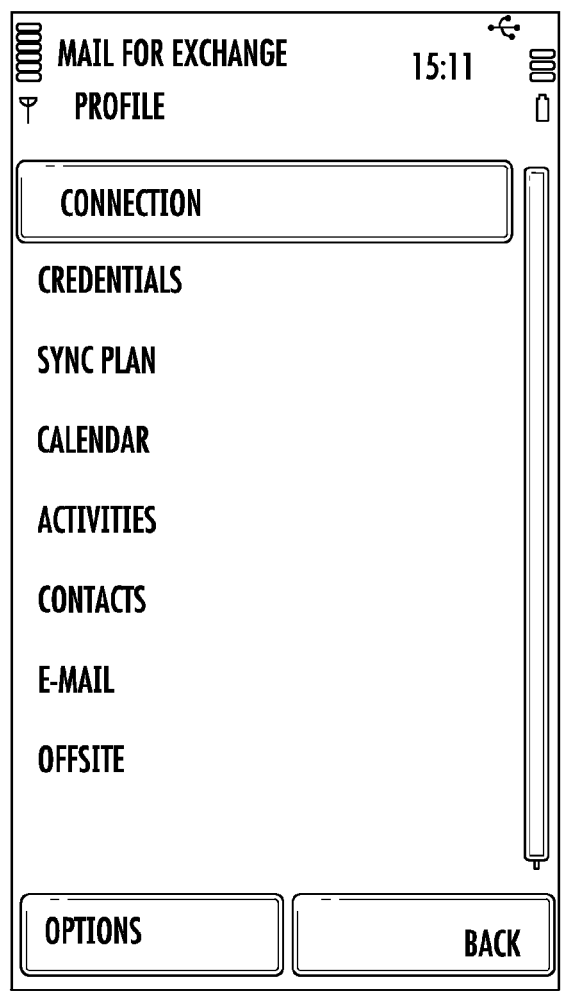
FIG. 1a is an illustration of an html page that can be displayed through an SCWS, according to the prior art.
Figure 1B:
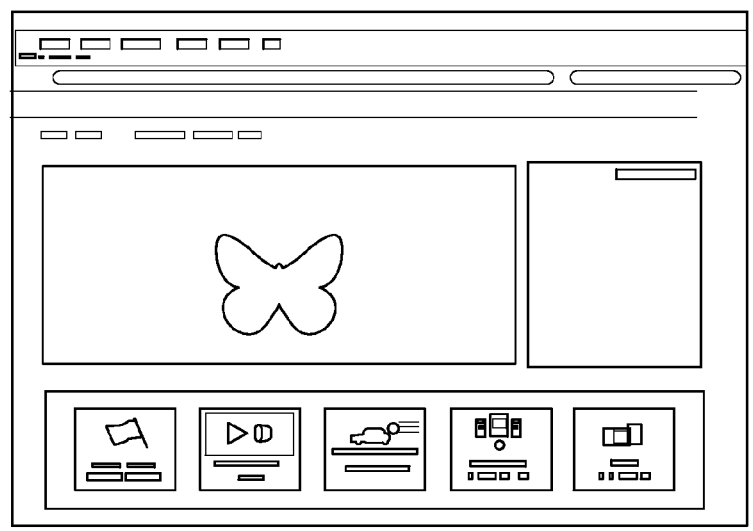
FIG. 1b is an illustration of a text menu that can be displayed through an SAT, according to the prior art.
Figure 2:
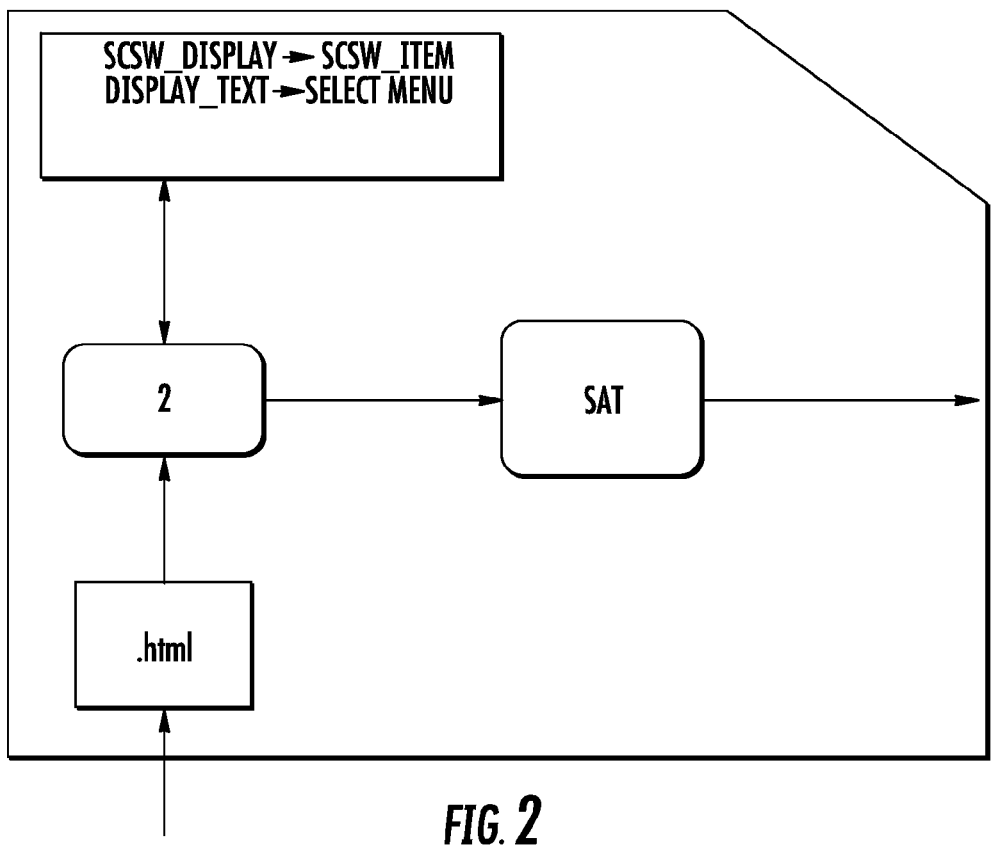
FIG. 2 is a schematic block diagram illustrating the approach according to a present embodiment.

With reference to FIG. 2 a method is schematically shown for executing a proactive command or SAT action (SIM application toolkit) in an IC card 1, according to the present approach. The SAT or SIM application toolkit includes a group of commands that allow the IC card 1 to communicate with the respective handset or with the network the handset is connected to. In particular, the SAT allows to receive the requests from the handset or from the network or to send requests to the network or to the handset, for example to display a simple menu of the text type on a display of the handset. The handset does not support a protocol requested by a Smart Card Web Server (SCWS) and thus it is not able to display hypertext contents and images present in an html page stored on the IC card.

According to a method of an embodiment, one or more identifiers SCSW_DISPLAY, SCSW_ITEM, etc. are stored in the memory of the IC card 1 and correspond to respective actions SAT, like DISPLAY TEXT, SELECT MENU, also these ones stored in the memory of the card. By way of example hereafter a table is shown wherein, each identifier is associated with the respective SAT action, with a code ETSI of the toolkit action and with a description of the command.

| Description | Identifier | Toolkit action | Specification Command ETSI TS 102.223 |
|---|---|---|---|
| display an alpha numeral text | SCWS_Display | DISPLAY TEXT | 21 |
| Connection towards another page | SCWS_ITEM | SELECT MENU Or SET UP MENU | 24/25 |
| Input from keyboard and text shown | SCWS_INPUT_TEXT SCWS_INPUT_ALFANUM | GET INPUT | 23 |

According to the present approach, a web page, for example an html page (Index.html), is transmitted at the input to a converter 2 of the IC card 1 which is programmed for identifying one or more of the above identifiers SCSW_DISPLAY, SCSW_ITEM and related text information associated with the identifiers. Always, by way of example, an example is hereafter reported of html page, i.e. the Index1.html page.

| INDEX.HTML |
|---|
| <!DOCTYPE html PUBLIC "-//W2C//DTD XHTML 1.0 Transitional//EN" "http://www.w2.org/TR/xhtml1/DTD/xhtml1-transitional.dtd"> <html xmlns="http://www.w2.org/1999/xhtml">     <head>         <meta http-equiv="Content-Type" content="text/html; charset=utf-8" />         <title> Sei in the IC </title>         <link href="style.css" type="text/css" rel="stylesheet" />     </head>     <body>         <div class="header">             <div style="background-image:url(images/bckgrd.gif);"> <a href="javascript:void(0);"></a>             </div> |

-continued

INDEX.HTML

```
                                        </div>
                    <table align="center">
                        <tr>
                                        <td><a
href="page1.html"><!-- SCWS__ITEM__0 --><img
src="images/1.gif"                         alt="Credito
residuo"></a></td>
                                        <td><a
href="page2.html"><!-- SCWS__ITEM__0 --><img
src="images/2.gif" alt="Ricarica un amico"></a></td>
                                        <td><a
href="page2.html"><!-- SCWS__ITEM__0 --><img
src="images/2.gif" alt="RicaricaTi"></a></td>
                                        <td><a
href="page4.html"><!-- SCWS__ITEM__0 --><img
src="images/4.gif" alt="Chiamate"></a></td>
                                        <td><a
href="page5.html"><!-- SCWS__ITEM__0 --><img
src="images/5.gif" alt="Stamp"></a></td>
                        </tr>
                                        <td><a
href="page6.html"><div class="SCWS__ITEM__0"><img
src="images/6.gif" alt="Sport"></div></a></td>
                                        <td><a
href="page7.html"><div class="SCWS__ITEM__0"><img
src="images/7.gif" alt="Giochi"></div></a></td>
                                        <td><a
href="page0.html"><div class="SCWS__ITEM__0"><img
src="images/0.gif" alt="Internet"></div></a></td>
                        </tr>
                    </table>
</body></html>
```

According to the approach, the converter 2 of the IC Card 1 sends the toolkit actions DISPLAY TEXT, SELECT MENU corresponding to the identifiers SCSW_DISPLAY, SCSW_ITEM identified in the html page and the related text information to the handset so that it displays the text information of the html page Index.html as text and menu SAT. With reference to the example above reported, the determination of the entries of the menu to be displayed, i.e. of the text information, is executed by the converter on the basis of the value of the attribute "alt" related to the tag <IMG> associated with the identifier SCSW_ITEM. Hereafter the output is reported of the menu associated with the converted toolkit action: -residual credit-Re-charge a friend-recharge yourself-Calls-Ansa-Sport-Games-ScripACM-Internet. It is provided that each identifier can be associated with one or more specific attributes, as it is clear from the following description.

According to an aspect of the present approach, the html page can have a link towards a dynamic page, like page Page1.html, hereafter reported.

PAGE1.HTML

```
<body>
<!-SCWS__INPUT__FORM -->
<form action="second.java" method="get">
<div class="SCWS__INPUT__TEXT__1">First name</div>: <div
class="SCWS__INPUT__ALPHANUM__1"><input type="text"
name="fname" /><br />
<!-- SCWS__INPUT__TEXT__2 -->Last name: <!--
SCWS__INPUT__ALPHANUM __2--><input type="text" name="lname"/>
<br />
<input type="submit" value="Submit" />
</form>
</body>
```

The html page points to the dynamic page (second.java) comprising an identifier SCWS_INPUT_FORM that indicates the parser that that page needs interaction with the user, and one or more identifiers SCSW_INPUT_TEXT, SCSW_INPUT_ALFANUM of dynamic toolkit actions GET INPUT that can be identified by the converter 2. In particular, the information related to the identifiers SCSW_INPUT_TEXT, SCSW_INPUT_ALFANUM of actions SAT GET INPUT are a text inserted by the user, preferably acquired by the keyboard of the handset. In other words, when the converter 2 identifies an identifier of SAT action it awaits a piece of information from the handset, prior to processing the successive toolkit action. With reference to the example above reported, the converter 2 identifies the identifier SCWS_INPUT_FORM and determines that the page contains a form and thus an interaction with the user; subsequently it identifies the identifiers SCWS_INPUT_TEXT_1 and SCWS_INPUT_ALPHANUM_1 that are both associated with the toolkit action GET_INPUT; the execution of this action needs a text parameter and this latter is identified by the converter in the fixed text information "First name", associated with the identifier SCWS_INPUT_TEXT_1 of the page Page1.html. Going on with the analysis of the page Page1.html, the converter 2 identifies the identifier SCWS_INPUT_ALPHANUM_1, also associated with the toolkit action GET_INPUT; the execution of this action needs a parameter that in this case is not a fixed value cabled in the page but a value inserted by the user.

Once the user has inserted the necessary information these are passed by the converter 2, associated with the name parameter of the tag input, to the servlet that will process these information.

According to one embodiment, the html pages, for example Index.html or Page1.html, are stored in the IC card 1; the latter, not having a SCWS, displays the text information under the form of text and SAT menu.

According to an embodiment, the converter 2 identifies the text information through a marker or tag associated with the respective identifier SCSW_DISPLAY, SCSW_ITEM, . . . . For example, always with reference to the example of the Index1.html page, the marker "alt" is associated with the identifier SCSW_ITEM.

Preferably, the identifiers SCSW_DISPLAY, SCSW_ITEM, . . . , the corresponding toolkit actions DISPLAY TEXT, SELECT MENU, and the associated markers are stored in a table of the IC Card 1.

According to another aspect, the html page is associated with an action or program, for example with a servlet stored in the IC Card.

Advantageously, the inquirer has foreseen to associate a common root SCSW with all the identifiers SCSW_DISPLAY, SCSW_ITEM, and a suffix DISPLAY, ITEM, INPUT_TEXT, INPUT_ALFANUM, identifying the corresponding toolkit action. Moreover, this has foreseen that the converter 2 groups, in a single toolkit action, two or more text information associated with two or more corresponding identifiers SCSW_INPUT_TEXT_1, SCSW_INPUT_ALFANUM_1; the grouping comprises the identification of a suffix 0, 1, 2 . . . , preferably numeral, common to the identifiers SCSW_INPUT_TEXT_1, SCSW_INPUT_ALFANUM_1. For example, always with reference to the example of Page1.html page, the identifiers SCSW_INPUT_TEXT_1, SCSW_INPUT_ALFANUM_1 are associated with the same toolkit action GET_INPUT through the suffix 1. Similarly, the identifiers SCWS_ITEM_0 in the example of the Index1.html page are associated with the same display toolkit action SELECT_MENU.

Figure 3:
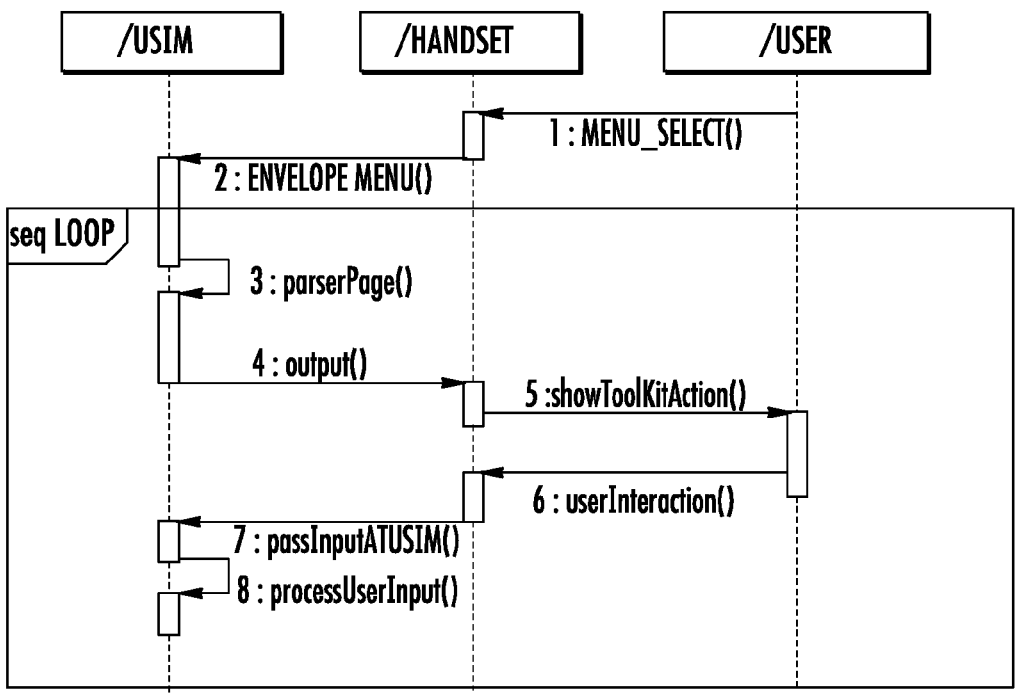
FIG. 3 is a schematic diagram illustrating the interaction between the IC card, the handset and the user, according to the approach of a present embodiment.

With reference to FIG. 3 hereafter the operation of the converter 2 of the card is described, during the communication with the handset and a user. The handset, which cannot communicate with a SCWS, communicates with the SAT of the IC CARD for accessing the services stored in the IC CARD. In particular, the user selects through the handset a menu of the IC CARD and the handset transmits a command "envelope Menu selection" to the IC CARD.

The converter 2 of the IC CARD processes an html page associated with the menu entry selected by the user, identifies the identifiers present in this html page and the respective toolkit actions and transmits the respective commands to the SAT of the IC CARD, for the text menu display on the display of the handset. At this point, the user can select another entry from the text menu or insert, via the keyboard of the handset, a text input, if provided by the displayed menu. If a text input is inserted, the handset communicates with the SAT of the IC CARD and transmits the information to the converter 2 which processes the user's input; in particular, the converter 2 determines whether to execute a servlet, i.e. a dynamic application, or to analyze another html page, showing a new text menu.

Figure 4:
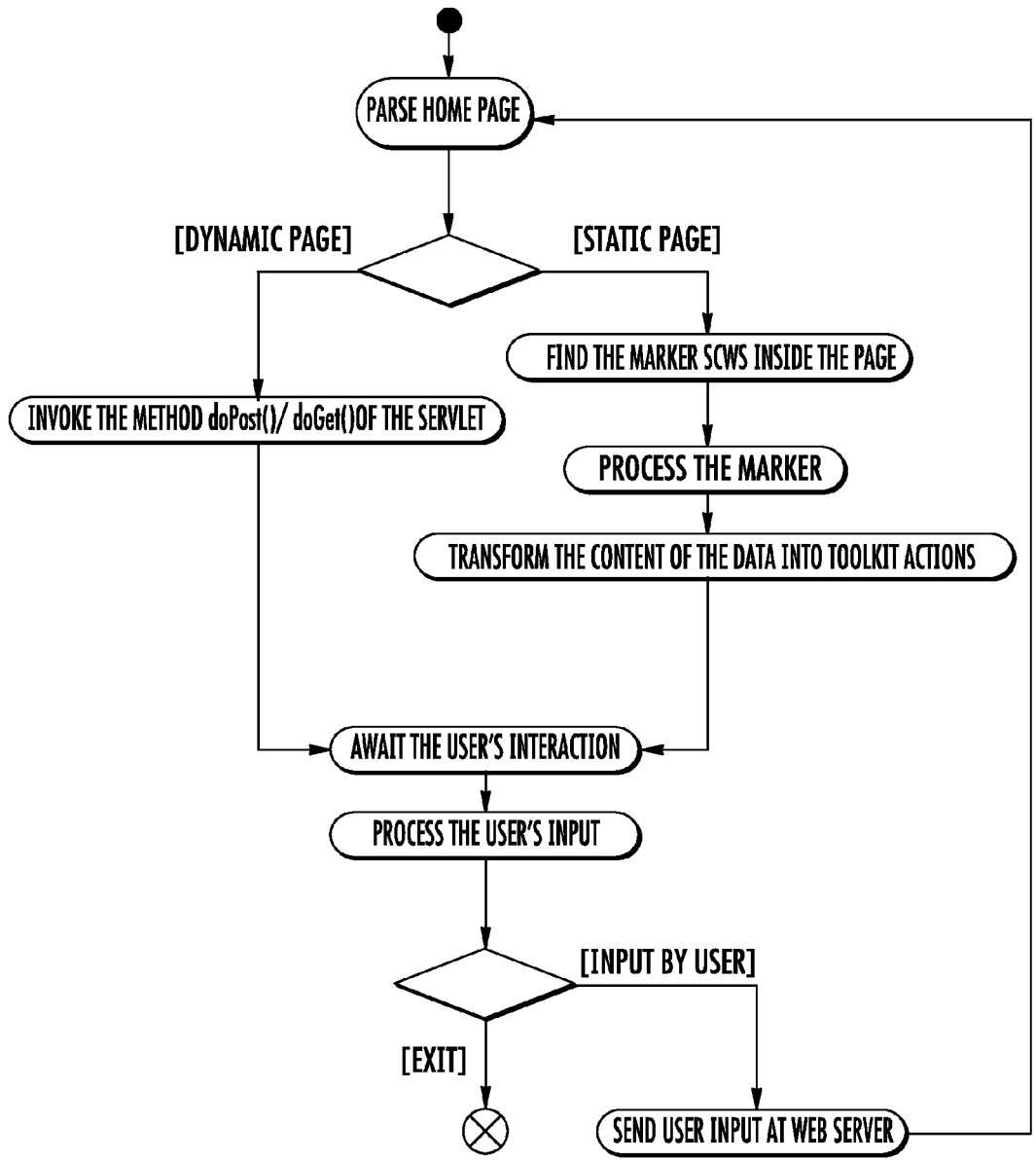
FIG. 4 is a flowchart illustrating steps of a method according to an embodiment.

FIG. 4 shows in greater detail the operation of the converter 2. A decisional block is representative of the different operation of the converter 2 on a dynamic or static page. In the case of dynamic page, the converter uses the functions, or methods, doGet( ) or doPost( ) according to the standard ETSI TS 102 588, for executing the servlet, simulating the operation of an SCWS.

Advantageously, according to the present approach, the execution of the applications corresponding to toolkit menu is very quick since it foresees to consider the sole text information associated with the identifiers stored in the IC Card.

According to an embodiment, the identifiers are marked by an html "<div>" tag having a "class" attribute whose value starts with the string "SCWS_" or comments whose value starts with "SCWS_". For example, with reference to the Index1.html page, the converter 2 ignores the whole content of the html page until arriving at the identifier "SCWS_ITEM_0". At this point, the converter 2 identifies the suffix ITEM, the corresponding toolkit action, and the attribute alt which executes the comment, extracting the related content ("Residual credit"); the converter 2 continues to examine the html page repeating the same procedure with all the other attributes "alt", and converts the html page into the following toolkit action command:

DO 64
8103012500 (command code)
82028182
850F4D454E55205745422053455256 4552 (Title of menu)
8F0F014372656469746F207265736964756F (Residual credit)
8F11025269636172696 36120756E20616D69636F (Recharge a friend)
8F0A03526963617269636 15469 (Recharge Yourself)
8F0804436869616D617465 5 (Calls)
8F04055374616070 (Stamp)
8F050653706F7274 (Sport)
8F060747696F636869 (Games)
8F0808496E7465726E6574 (Internet)

Finally, the toolkit action is sent through the SAT to the handset that displays the toolkit menu and awaits a selection by the user. If the user selects the desired entry (e.g. the entry "Residual credit") the handset communicates the selection to the converter 2 which associates this choice with the Page1.html page, indicated as "href" value in the tag "a".

In the Page1.html page, the converter identifies the identifier SCWS_INPUT_FORM, which indicates that the successive user's input must be transmitted, through API standard ETSI 102.588, of the dynamic page (second.java) indicated in the tag HTML "form" successive to the identifier SCWS_INPUT_FORM. The user's input is associated with the identifiers SCWS_INPUT_TEXT and SCWS_INPUT_ALFANUM of the same group 1.

Advantageously, according to the method, the html page can be coded only once and be interpreted both by the handset provided with the SCWS, and by the handset provided with the sole SAT, and displayed in different modes by these handsets. The IC card provided with the SAT displays the text information under the form of toolkit or text menu and the IC Card provided with the SCWS displays the text information in an html page, providing them with the respective hypertext content, i.e. images, videos, sound recordings, hypertext connections.

Advantageously, since the converter allows to display the text content of an html page also in the handsets which are not provided with the SCWS, it is possible to program the applications and the services for the user only once, i.e. avoiding the need to code different versions of the application.

That which is claimed:

1. A method for executing a SIM Application Toolkit (SAT) action in an IC card, the method comprising: storing at least one identifier and corresponding SAT action in the IC card; transmitting a web page to an input of a converter of the IC card, the converter being configured to identify at least one identifier in the web page and related text information associated with the identifier and identify at least one identifier of SAT interactive-type actions in the web page, wherein the converter identifies the textual information through a marker associated with the respective identifier and the identifiers, the corresponding SAT actions and the associated markers are stored in a table of the IC Card; sending the SAT action corresponding to the identified identifier and the related text information to an SAT application of the IC card, for displaying the text information of the web page as an SAT action and executing a servlet associated with the web page when at least one identifier of SAT interactive-type actions in the web page is detected by the converter; and executing a servlet associated with the web page once when at least one identifier of SAT interactive-type actions in the web page is detected by the converter for displaying text information in a web page by a handset using SAT or a handset using a Smart Card Web Server (SCWS).

2. The method according to claim 1 wherein the text information associated with the identifiers of SAT interactive-type actions are acquired via text inserted by a user operating a device having the IC Card inserted therein.

3. The method according to claim 2 wherein the converter transmits to the servlet the text information acquired by the user's input.

4. The method according to claim 1 further comprising storing the web page in the IC card.

5. The method according to claim 1 wherein the servlet is stored in the IC Card.

6. The method according to claim 1 wherein the identifiers comprise a common base and a suffix identifying the corresponding SAT action.

7. The method according to claim 1 wherein the converter groups, in an SAT action, at least two pieces of text information associated with corresponding identifiers, and includes the identification of a suffix common to the identifiers.

8. The method according to claim 7 wherein the converter identifies the grouping identifiers via the suffix.

9. A method for executing a SIM Application Toolkit (SAT) action in an IC card having a converter, the method comprising: storing an identifier and corresponding SAT action in the IC card; transmitting a web page to the converter of the IC card; identifying, at the converter, the identifier in the web page and related text information associated with the identifier and identifying at least one identifier of SAT interactive-type actions in the web page, wherein the converter identifies the textual information through a marker associated with the respective identifier and the identifiers, the corresponding SAT actions and the associated markers are stored in a table of the IC Card; sending the SAT action corresponding to the identified identifier and the related text information to the SAT application stored in the IC card to display the text information of the web page and execute a servlet associated with the web page when at least one identifier of SAT interactive-type actions in the web page is detected by the converter; and executing a servlet associated with the web page once when at least one identifier of SAT interactive-type actions in the web page is detected by the converter for displaying text information in a web page by a handset using SAT or a handset using a Smart Card Web Server (SCWS).

10. The method according to claim 9, wherein the text information associated with the identifiers of SAT interactive-type actions are acquired from a user-provided text via a device having the IC Card inserted therein.

11. The method according to claim 10 wherein the converter transmits to the servlet the textual information acquired from the user.

12. The method according to claim 11 wherein the servlet is stored in the IC Card.

13. The method according to claim 9 further comprising storing the web page in the IC card.

14. An integrated circuit (IC) for an IC card including a SIM Application Toolkit (SAT) and comprising: a memory configured to store identifiers and corresponding SAT actions; a converter configured to receive a web page and to identify identifiers and associated textual information in the web page and identify at least one identifier of SAT interactive- type actions in the web page; the SIM Application Toolkit configured to send, to a device wherein the IC Card is inserted, the SAT actions corresponding to the identified identifiers and the associated text information, for displaying the text information of the web page and executing a servlet associated with the web page when at least one identifier of SAT interactive-type actions in the web page is detected by the converter; and execute a servlet associated with the web page once when at least one identifier of SAT interactive-type actions in the web page is detected by the converter for displaying text information in a web page by a handset using SAT or a handset using a Smart Card Web Server (SCWS) wherein the converter identifies the textual information through a marker associated with the respective identifier and the identifiers, the corresponding SAT actions and the associated markers are stored in a table of the IC Card.

15. The IC according to claim 14 wherein the converter is configured to acquire the text information associated with the identifiers of SAT actions from an input from a user operating a device wherein the IC Card is inserted.

16. The IC according to claim 15 wherein the converter is configured to execute the servlet based upon the text information acquired via the user's input.

17. The IC according to claim 14 wherein the web page is stored in the memory.

* * * * *